UNITED STATES PATENT OFFICE.

VICTOR VILLIGER AND HEINRICH von KRANNICHFELDT, OF LUDWIGSHAFEN-ON-THE-RHINE, GERMANY.

GREEN DYESTUFF AND PROCESS OF MAKING SAME.

1,396,483.  Specification of Letters Patent.  Patented Nov. 8, 1921.

No Drawing.  Application filed July 9, 1920. Serial No. 395,182.

*To all whom it may concern:*

Be it known that we, VICTOR VILLIGER and HEINRICH VON KRANNICHFELDT, citizens of the Swiss Republic, residing at Ludwigshafen-on-the-Rhine, Germany, have invented new and useful Improvements in Green Dyestuffs and Processes of Making Same, (for which we have filed applications in Germany April 28, 1917,) of which the following is a specification.

The present invention relates to a new green coloring matter derived from alpha-naphthoquinone. The new product is obtained by heating alpha-naphthoquinone in the presence of water or of certain other solvents until condensation occurs. The reaction taking place is of a complicated nature and a yellow intermediate product is first formed which on treatment with non-alkaline reducing agents yields the green coloring matter. In the first stage naptho-hydroquinone is formed simultaneously and inasmuch as it has reducing properties it can serve as a reducing agent in the further course of the reaction, so that the green product can be obtained in a single operation directly from alpha-naphthoquinone by heating the same to a sufficiently high temperature and for a sufficient time, say at about 160 degrees centigrade for a few hours. On the other hand, the yellow intermediate product can be obtained without an admixture of the green product, or of considerable quantities thereof, by suitably regulating the duration of heating and the temperature. It may be stated that concentrated hydrochloric acid is not suitable for the treatment of the alpha-naphthoquinone for the present purpose.

The yellow intermediate product forms a highly valuable initial material, while the green coloring matter has very favorable properties as a vat dyestuff, or a pigment, excelling by an extraordinary fastness to light.

The new products contain no nitrogen and are apparently of a high-molecular nature; according to the analysis, the yellow first product may have a composition according to the empirical formula $C_{30}H_{12}O_6$ while the green coloring matter itself corresponds about to the formula $C_{30}H_{14}O_5$. We ascribe

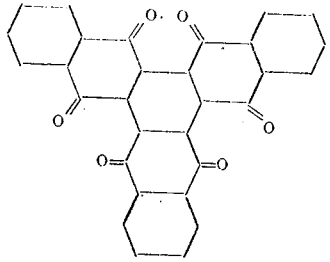

the constitutional formula to the yellow product, and the constitutional formula

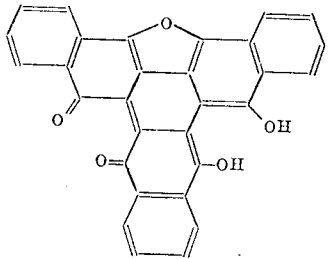

to the green matter; but we do not limit ourselves to compounds of the above formula, as further investigation may lead to different views as to the constitutions.

The dyeing process can be effected for cotton from the solution of the dyestuff prepared by means of alkaline hydrosulfite, or sodium sulfid solution, for animal fibers from a vat prepared with the aid of sodium hydrosulfite and an alkali carbonate. Or the padding or printing methods may be employed usual for vat coloring matters. The green dyeings turn brown if spotted with dilute caustic soda lye of say 10 per cent., but on washing with water the original color is gradually restored; upon treatment with nitric acid they change to a yellow color.

The following examples illustrate this invention and the manner of carrying the same into practical effect, but the invention is not limited thereto.

*Example 1.*

Four parts of alpha-naphthoquinone are heated with five parts of water, in an autoclave provided with stirrers for about two hours, at temperatures exceeding 100 degrees centigrade, for example, 120-130 degrees centigrade. The alpha-naphtho-hydroquinone which is formed in the reaction mixture at the same time, is extracted by boiling with water, and can be transformed into naphthoquinone, for use in a new operation. The residue can be purified by boiling with dilute caustic soda and vatting in hydrosulfite solution rendered alkaline with sodium carbonate and again oxidizing. The resulting greenish yellow product, after extraction with nitro-benzol, crystallizes from boiling cresol in the form of pale-yellow needles, which are insoluble in water, dilute acids and alkalis, and also in solvents of low boiling point, being only soluble with great difficulty in certain solvents of high boiling point. When heated above 300 degrees centigrade, the product gradually decomposes without fusing.

It dissolves in concentrated sulfuric acid with a light-yellow color and is precipitated from this solution in an unaltered state on diluting with water. By hydrosulfite solution rendered alkaline with sodium carbonate it is also dissolved with a light-yellow color and is precipitated in an unaltered state on oxidizing with air.

*Example 2.*

Another method of producing the yellow intermediate product consists in dissolving 10 parts of alpha-naphthoquinone in 60 parts of phenol. Water is added in such quantity that the mixture boils at about 120 degrees centigrade, and boiling is carried on, under a reflux condenser, so long as the crystalline precipitate gradually formed still remains pure yellow in color, (about 40 hours). When cold, the product is aspirated, and the adherent phenol is removed by washing with alcohol or the like. In this way the intermediate product is obtained direct in crystalline form.

*Example 3.*

The yellow condensation product can be transformed into the green dyestuff by dissolving one part thereof in ten parts of concentrated sulfuric acid and gradually adding two parts of zinc dust while stirring and cooling with ice. Stirring is continued for a short time, and the mixture is poured on to ice water. The product, which separates in the form of green flakes, is aspirated, washed with water and stirred up to paste, or dried. It is insoluble in water, dilute acids and alkalis, and in solvents of low boiling points, but dissolves to a brownish solution in concentrated sulfuric acid. From solvents of high boiling point, for example boiling nitro-benzol, it crystallizes out, on rapid cooling, in the form of matted green needles. If the solution is cooled slowly, steel-blue granular crystals are obtained, which decompose slowly, without fusing, at temperatures above 300 degrees centigrade. Oxidation with nitric acid causes reversion to the original yellow material. It is also soluble in alkaline hydrosulfite with a yellow color and in alkali sulfid solution also with a yellow color. If treated with dilute caustic soda (of say 10 per cent.) it turns brown without being dissolved but on strongly diluting with water the original green color is restored. When boiled with benzoyl chlorid it is quickly dissolved yielding a crimson colored solution.

*Example 4.*

Alpha-naphthoquinone is heated with the same weight of water for about four hours at 160 degrees centigrade in an autoclave provided with stirrers. After cooling, the blackish green product is crushed, freed from naphtho-hydroquinone and other by-products soluble in alkali, by extracting first with boiling water, then with dilute caustic soda, and purified, for example, by vatting with hydrosulfite rendered alkaline with sodium carbonate and if desired, by recrystallization from boiling nitro-benzol. It is identical with the product described in Example 3.

Now what we claim is:—

1. As a new article of manufacture, a green alpho-naphthoquinone condensation product which product contains no nitrogen and is practically insoluble except in solvents of high boiling point, soluble in alkaline hydrosulfite and in alkali sulfid solution with a yellow color, and in concentrated sulfuric acid with a brown color, and which if treated with dilute caustic soda lye turns brown, the green color being restored on strongly diluting with water, and which product is converted by nitric acid into a yellow product, and which green product dissolves when boiled with benzoyl chlorid yielding a crimson colored solution.

2. The process of producing a green product by heating alpha-naphthoquinone in the presence of water, until it is substantially decomposed and treating the yellow product first formed with a non-alkaline reducing agent.

3. The process of producing a green product by heating alpha-naphthoquinone in the presence of water at sufficiently high temperatures until the green product no longer increases in quantity.

4. The process of producing a yellow condensation product derived from alpha-naphthoquinone, which product is very difficultly soluble in solvents of high boiling point and in concentrated sulfuric acid with a light-yellow color and in alkaline hydrosulfite solution rendered alkaline with sodium carbonate with a light-yellow color, which process consists in heating alpha-naphthoquinone in the presence of water until green products are formed.

In testimony whereof we have hereunto set our hands.

VICTOR VILLIGER.
HEINRICH VON KRANNICHFELDT.